April 11, 1961 J. W. ANDERSON 2,979,352
ARM CONNECTOR
Filed Oct. 17, 1955
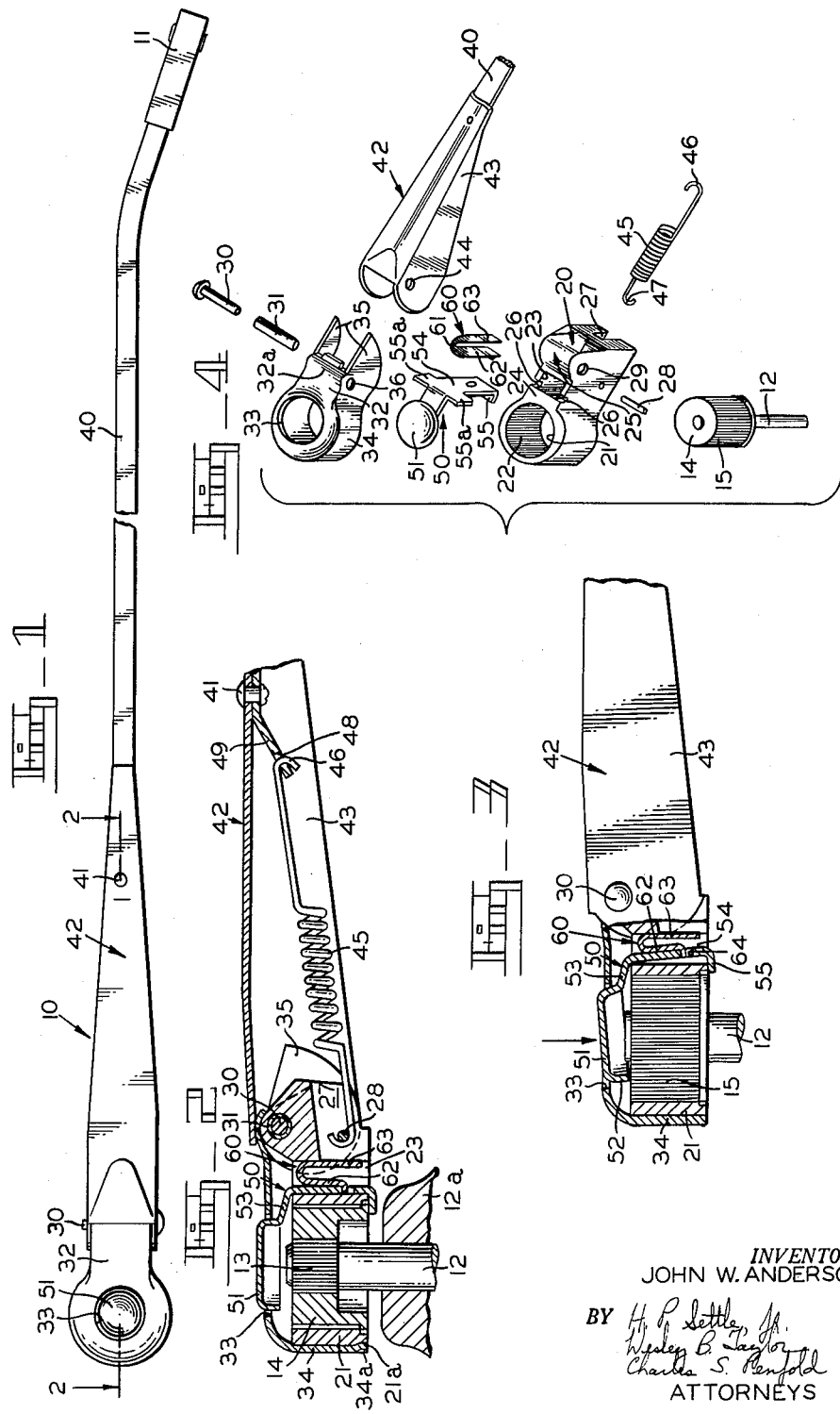
INVENTOR.
JOHN W. ANDERSON
ATTORNEYS

United States Patent Office 2,979,352
Patented Apr. 11, 1961

2,979,352

ARM CONNECTOR

John W. Anderson, Gary, Ind., assignor to The Anderson Company, a corporation of Indiana Filed Oct. 17, 1955, Ser. No. 540,713

18 Claims. (Cl. 287—53)

The present invention relates to a connector for quickly attaching and detaching a member to a support therefor and, more particularly, to a connector for so attaching and detaching an arm, such as a windshield wiper arm, to an oscillatable actuating shaft.

Various types of connectors have been suggested for the purpose mentioned, but to my knowledge none is capable of quick removal. Moreover, those in present use usually require a tool to install or remove a connector with respect to a support. The task of removing a used wiper arm on the actuating pivot shaft of an automobile, as distinguished from removing a used wiper blade, can be very annoying to an automobile owner, but, more seriously, the actual time required for correctly installing a wiper arm on the shaft is an important factor in the assembling of an automobile on a mass production basis. In order to maintain a desired pace of movement along an assembly line, it is highly desirable that a worker be able to perform each of his assigned tasks with a minimum of time and effort.

It sometimes happens that a wiper arm is incorrectly installed in that it is inadvertently placed in the wrong angular relation with respect to a driving shaft. If left unchanged, the arm would cause the blade to traverse an offset arcuate path, that is, strike against a side of the windshield, reach beyond the windshield area, and the like. Accordingly, when incorrect installation is noticed by an inspector, it is necessary to remove the arm and reinstall it in the proper position. Obviously, this consumes important time in the assembly of an automobile along the ever-moving production line.

Prior connectors have not been capable of quick removal and, therefore, have required more time to correct an improper installation than is desired. One common type of connector, for example, involves a bolt or similar fastener which passes through one end of the wiper arm and into a threaded socket. In another type, a finishing nut is screwed over a threaded stud extending upwardly through one end of a wiper arm. In either case, a wrench is required to loosen the bolt or nut in order to reposition the arm in proper relation with the shaft. In addition to necessitating another tool for the assembly worker, the turning of the fastener consumes a longer time than desirable to effect the correct arm installation.

To remove some connectors, even where a bolt or nut is not used and the connector is fairly quickly installed, it is still necessary to reach under and within the structure of the connector to release a catch. This also has the disadvantage of taking longer than desirable and of requiring a tool. Moreover, the tool oftentimes slips, thereby marring the surrounding surface finish of the automobile cowl.

In the present connector, a fast action is achieved in attaching and particularly detaching an arm by means of a pivoted latch or lever which is carried within a casing forming the connector. One end of the lever is exposed through an opening in the casing whereby it may be readily tripped to move the other end of the lever in and out of latching engagement with a support to which the arm is to be attached. Resilient means normally pivots the lever to a closed latching position.

It is, therefore, a primary object of the instant invention to provide a connector which quickly attaches and, more importantly, quickly detaches a member, such as a wiper arm, from a support, such as a driving shaft.

A further object is to provide a connector for a wiper arm which does not require a tool for detaching the connector from a driving shaft.

An additional object of the present invention is the provision of a windshield wiper arm-shaft connection which employs a pivoted, spring-urged latching lever actuatable exteriorly of the connection to facilitate removal of the arm from the shaft.

Other objects are apparent from the following description of the invention and the appended drawing.

On the drawing:

Figure 1 is a plan view of a wiper arm having the present improved connector;

Figure 2 is an enlarged fragmentary sectional view of the arm of Figure 1, taken along the plane 2—2 of Figure 1, and illustrating the latching mechanism in a closed or latching position;

Figure 3 is a sectional view similar to that of Figure 2 but illustrating the latching mechanism in an open or releasing position; and Figure 4 is a perspective exploded view of the parts of the latching mechanism.

As shown on the drawing:

The embodiment of the present invention disclosed in the drawings includes a wiper arm generally shown at 10 having a conventional attachment 11 to connect a wiper blade (not shown) to the arm. A driving shaft 12 for actuating the arm extends upwardly through a boss 12a and has a spline section 13 to interfit between similar inner splines of a supporting ring or drum head 14 which is also provided with outer splines 15. The ring 14 makes a tight press fit about the splines of the shaft 12. The arm 10 is supported by the shaft 12 and the ring 14.

The arm 10 and the ring 14 are joined by the improved connector of the present invention. The connector includes a mounting piece generally shown at 20, a casing 34 which houses the mounting piece and pivotally connects to the arm 10, and a pivotal latch or lever 50 which attaches and detaches the mounting piece 20 with respect to the supporting ring 14.

Considering these general parts in the order named, the mounting piece has a substantially annular portion 21 provided with splines 22 which interfit with the splines 15 of the supporting ring 14. As shown in Figures 2 and 3, the splines 22 and 15 terminate short of the bottoms of the rings 14 and 21, so that the latter ring seats firmly over the former. The mounting piece also includes a pair of walls 23 which project generally radially outwardly from the annular portion 21 and which are joined by a portion of the annular ring, generally indicated at 24. The walls 23 have recesses 26 adjacent the portion 24. A backing and reinforcing wall 25 extends between the outer extremities of the walls 23 and has a lower, open-bottomed slot 27 paralleling these walls. A pin 28 also extends between the walls 23 and through the slot 27 to receive a spring as hereinafter described. The reinforcing wall 25 has a transverse bore 29 to receive a pin 30 and a concentric bearing sleeve 31 by which the casing 34 and the outer extension of the arm 10 are pivotally connected to the mounting piece.

The casing 34 is substantially cup-shaped and has a central opening 33 in its upper end. A tab 32 extends outwardly from the casing and terminates in an arcuate portion 32a which fits over a conforming upper portion of the reinforcing wall 25. Flanges 35 which project outwardly from the annular portion straddle the walls 23 and serve as stops for the downward pivoting of the arm outer section about the pin 30. The flanges have openings 36 aligned with the bore 29 to receive the pin 30. The casing 34 is fixed to the annular portion 21 of the mounting piece. This may be accomplished in several ways. In the embodiment shown, the casing is punched inwardly at 34a to engage a shoulder 21a and prevent relative movement between the casing and the annular portion 21.

The arm 10 includes an arm extension 40 preferably formed of bar stock and fixed by a rivet 41 to a channel 42. The channel has sides 43 provided with openings 44 to receive the pin 30. A spring 45 has hooked ends 46 and 47 and urges the arm clockwise about the pin 30 as viewed in Figure 2. Hook 46 engages an opening 48 in an offset end 49 of the bar 40, while hook 47 engages the pin 28.

A latch or latching lever 50 is provided to retain the annular mounting piece 20, and therefore the entire arm 10, on the driving head 14. This latch is preferably formed in one piece, as by stamping from sheet metal, and includes, at one extremity, an operating section 51 in the form of a push button having a depending annular flange 52 which merges with the laterally directed medial portion 53 joining the push button 51 to a depending leg 54. The leg 54 is provided with a laterally directed lip or detent 55, for a purpose to be hereinafter more fully explained.

The depending leg 54 is provided with laterally directed, outwardly extending flanges 55a which provide trunnions enterable into the notches 26 formed in the walls 23. The latching lever is assembled with respect to the mounting piece 20 as best shown in Figures 2 and 3, with the push button portion 51 of the lever projecting through the casing aperture 33 and the depending leg 54 projecting downwardly through the aperture between the walls 23, so that the lip or detent 55 underlies both the annular wall 21 of the mounting piece 20 and the attaching head 14.

To normally retain the latching lever in its position of Figure 2, a hairpin spring 60 is laterally confined between the walls 23. This spring 60 is provided with an arcuate joining portion 61 connecting depending legs 62 and 63, the leg 62 abutting the vertically extending leg 54 of the lever and having a lateral terminal edge entered in an aperture 64 formed in the depending portion 54 of the lever. The other leg 63 of the spring is bottomed against the mounting piece. Thus the spring normally urges the latching lever in a clockwise direction about the pivot centers defined by the trunnions 55a seated on the shoulders 26, so that the terminal lip or detent 55 underlies the serrated ring 14.

To remove the arm from driver drum 14, it is only necessary to depress the push button 51 to rock the lever 50 against the biasing force of the spring 60 and about the trunnions 55a so that the terminal projection 55 is retracted, as shown in Figure 3, to underlie only the mounting ring 21. Next, the casing may be firmly grasped with the fingers and lifted from the mounting head 15.

To install the wiper arm upon the mounting head 14, it is only necessary to axially align the mounting piece 20, and more particularly the aperture 21 thereof, with the driver head 14 and manually push the mounting piece onto the mounting head.

Various details of construction may be varied through a wide range without departing from the principles of this invention, and it is, therefore, not the purpose to limit the patent granted hereon otherwise than necessitated by the scope of the appended claims.

I claim:

1. A connector including: a member adapted for connection with a support, a casing attached to the member and provided with an opening, a lever pivotally carried on the member having an operating portion and a catch-engaging portion, the operating portion being stationed opposite said opening and accessible therethrough, the catch-engaging portion having means to engage the support and prevent its withdrawal from the member, and means normally pivoting the lever to engage said means with the support.

2. A connector for attaching a wiper arm to a support, including: a casing attachable to the arm and adapted to receive the support therein, said casing having an opening located substantially axially opposite the support, a lever pivotally carried within the casing having an operating portion and a catch-engaging portion, the operating portion extending into the opening and being accessible therethrough, the catch-engaging portion extending along the support and having means to engage the support and prevent its withdrawal from the casing, and resilient means normally pivoting the lever to position the operating portion by the opening and to engage said means with the support.

3. A connector for attaching a wiper arm to a pivotal support, including: a substantially cup-shaped casing attachable to the arm and having an opening in an end thereof, a mounting having a ring within the cup-shaped portion of the casing to receive the pivotal support, a latch pivotally supported on the mounting and having an operating section and a catch-engaging section angularly related to each other, said operating section extending over the mounting ring and being accessible through the opening in the casing, said catch-engaging section extending axially along the mounting ring and terminating in a detent to be disposed below the support to prevent its withdrawal from the casing, and resilient means normally pivoting the latch to position the operating section by the opening and to engage the detent with the support.

4. A connector for quickly attaching and detaching a windshield wiper arm to a pivotal drum, including: a substantially cup-shaped casing having an opening in the end thereof and flanges projecting outwardly from the sides adapted for connection to the arm, a mounting ring within the cup to receive the drum therein, means to prevent relative movement between the mounting ring and the drum, said mounting ring having outwardly projecting walls extending between the flanges of the casing and having laterally spaced recesses defining shoulders, a latch stationed between the walls having an operating section and a catch-engaging section angularly related, said operating section extending over the mounting ring and being accessible through the opening in the casing, said catch-engaging section extending axially along the mounting ring and terminating in a detent turned inwardly with respect to the mounting ring and underlying the mounting ring to underlie the drum to prevent the withdrawal of the drum from the casing, trunnions on said latch seated on said shoulders, and resilient means carried between said walls projecting from the mounting ring normally pivoting the latch to position the operating section by the opening and to engage the detent with the drum.

5. A connector as claimed in claim 4 wherein a backing wall extends between said walls projecting from the the mounting ring and is spaced from the catch-engaging section of the latch, and said resilient means is a spring interconnected with the latch which urges the backing wall and the catch-engaging section apart.

6. A connector as claimed in claim 5 wherein the spring is a metal strip folded on itself and the catch-engaging section of the latch has an opening to receive an end of the strip and maintain it in position.

7. A windshield wiping structure including an actuating shaft provided with a serrated drum head, a wiper arm attached to the serrated head comprising an attachment base portion and an annular mounting ring having interior serrations mating with those of said head, a latching lever having one end generally overlying the head in spaced relation thereto and having another end underlying the head to prevent removal of the ring therefrom, said lever having an intermediate fulcrum portion contacting the arm attachment base portion in spaced relation to the head, and resilient means urging said another end of said lever into its position underlying the head, depression of the lever one end against the action of the resilient means moving the lever about its fulcrum portion to remove the another end thereof from its position underlying the head, thereby accommodating removal of the ring from the head.

8. A windshield wiping structure including an actuating shaft provided with a serrated drum head, a wiper arm attached to the serrated head comprising an attachment base portion and an annular mounting ring having interior serrations mating with those of said head, a latching lever having one end generally overlying the head in spaced relation thereto and having another end underlying the head to prevent removal of the ring therefrom, said lever having an intermediate fulcrum portion, trunnions on the fulcrum portion contacting the arm attachment base portion in spaced relation to the head, and resilient means urging said another end of said lever into its position underlying the head, depression of the lever one end against the action of the resilient means moving the lever about its fulcrum portion to remove the another end thereof from its position underlying the head, thereby accommodating removal of the ring from the head.

9. A connector for quickly attaching and detaching a windshield wiper arm to a pivotal drum, including: a substantially cup-shaped casing having an opening in the end thereof and flanges projecting outwardly from the sides adapted for connection to the arm, a mounting ring within the cup to receive the drum therein, means to prevent relative rotary movement between the mounting ring and the drum, said mounting ring having outwardly projecting walls extending between the flanges of the casing and having laterally spaced recesses defining shoulders, and a latch stationed between the walls having trunnions seated on the shoulders and including an operating section and a catch-engaging section angularly related, said operating section extending over the mounting ring and being accessible through said opening, said catch-engaging section extending axially along the mounting ring and terminating in a detent turned inwardly with respect to the mounting ring and underlying the mounting ring to underlie the drum to prevent the withdrawal of the drum from the casing.

10. A connector for quickly attaching and detaching a windshield wiper arm to a pivotal drum, including: a substantially cup-shaped casing having an opening in the end thereof and flanges projecting outwardly from the sides adapted for connection to the arm, a mounting ring within the cup to receive the drum therein, means to prevent relative rotary movement between the mounting ring and the drum, said mounting ring having outwardly projecting walls extending between the flanges of the casing, a latch pivotally mounted on the walls and having an operating section and a catch-engaging section angularly related, said operating section extending over the mounting ring and being accessible through said opening, said catch-engaging section extending axially along the mounting ring and terminating in a detent turned inwardly with respect to the mounting ring and underlying the mounting ring and the drum to prevent the withdrawal of the drum from the casing, and resilient means carried between said walls projecting from the mounting ring normally pivoting the latch to position the operating section by the opening and to engage the detent with the drum.

11. A windshield wiper arm having a housing at one end for connection with a shaft provided with abutment means and means at its other end for supporting a blade, said housing including means for receiving the shaft, a latch mounted in the housing, and a cap carried by the housing, said latch having catch means for engaging the abutment means on the shaft to hold the arm on the shaft and also having a part overlying the receiving means of the housing for actuating the catch means to effect release thereof from the abutment means to permit the arm to be detached from the shaft, said cap being provided with an opening opposite said part affording access to said part for manipulating same.

12. A windshield wiper arm having a housing at one extremity for receiving a shaft provided with abutment means and means at its other extremity for supporting a blade, a cap carried by the housing and provided with an opening, said housing being provided with a recess, and a latch extending through the recess and provided with catch means adapted for cooperation with the abutment means on the shaft for holding the arm on the shaft, said latch also being provided with a part extending into the opening in the cap to facilitate manipulation of the part to actuate the catch means of the latch to release same from the abutment means.

13. A connector for attaching a member to a support including: a casing attachable to the member and adapted to accommodate the support, said casing having an opening, a mounting provided with a ring within the casing to receive the support and also provided with a recess, a lever within the casing having an operating portion and a catch-engaging portion angularly related and defining a fulcrum-engaging juncture, said juncture overlying and engaging a portion of the mounting, the operating portion being stationed opposite said opening and being accessible therethrough, the catch-engaging portion having abutment means to engage the support and prevent its withdrawal from the casing, and means normally biasing the lever to cause said abutment means to engage the support, said biasing means being disposed in the recess and held therein by said lever.

14. A connector for attaching a wiper arm to a support including: a casing attachable to the arm and adapted to receive the support therein, said casing having an end wall provided with an aperture, a mounting having a ring within the casing forming an opening axially aligned with said aperture to receive the support therein, a lever within the casing having an operating part and a catch-engaging portion angularly related to each other to define a fulcrum-engaging juncture, said juncture overlying and engaging a portion of the mounting, the operating part having a portion disposed between the end wall of the casing and the ring and a manually engagable portion at the aperture, the catch-engaging portion extending along the ring and having abutment means to engage the support and prevent its withdrawal from the casing, and resilient means normally biasing the lever to position its manually engagable portion at the opening and the abutment means for engagement with the support.

15. A connector for attaching a wiper arm to a pivotal support including: a substantially cup-shaped casing attachable to the arm and having an opening in an end thereof adapted for disposition substantially in alignment with the support when the connector is attached thereto, a mounting having a ring within the cup-shaped portion of the casing to receive the pivotal support, a latch having an operating section and a catch-engaging section angularly related to each other to define a fulcrum-engaging juncture, said juncture overlying and engaging a portion of the mounting, said operating section extending over the mounting ring and at the opening in the casing for manual engagement, said catch-engaging section being of substantially uniform width throughout the major portion of its length and extending axially along the mounting ring, a detent on the catch-engaging section to be disposed below the support to prevent its withdrawal from the casing, and resilient means normally biasing the latch to position the operating section at the opening and the detent for engagement with the support.

16. A connector for quickly attaching and detaching a windshield wiper arm to a pivotal drum including: a substantially cup-shaped casing having an opening in the end thereof and flanges projecting outwardly from the sides adapted for connection to the arm, a mounting having a ring within the cup to receive the drum therein, means to prevent relative rotary movement between the mounting and the drum, said mounting having outwardly projecting walls extending from the ring between the flanges of the casing, a latch stationed between the walls having an operating section and a catch-engaging section angularly related to each other to define a fulcrum-engaging juncture, said juncture overlying and engaging a portion of the mounting, said operating section extending over the mounting ring and past the opening in the casing for manual engagement, said catch-engaging section extending axially along the mounting ring and terminating in a detent turned inwardly with respect to the mounting ring and underlying the mounting ring to underlie the drum to prevent the withdrawal of the drum from the casing, and resilient means carried between said walls projecting from the mounting ring normally biasing the latch to position the operating section by the opening and to engage the detent with the drum.

17. A connector as claimed in claim 16 wherein the resilient means is a metal strip folded on itself and the catch-engaging section of the latch has an opening to receive an end of the strip and maintain it in position.

18. Windshield wiper apparatus including an actuating shaft, a serrated drum head on said shaft, a wiper arm attached to the serrated head and comprising a mounting having an annular portion provided with interior serrations adapted to mate with those of said head when the annular portion is axially telescoped over the head, a latching lever having one end generally overlying the head in spaced relation thereto when the head and mounting are assembled and having another end underlying the head to prevent removal of the mounting therefrom, said lever having an intermediate fulcrum portion contacting the mounting in spaced relation to the head, and resilient means urging said another end of said lever into its position underlying the head, depression of said one end of the lever against the action of the resilient means moving the lever about its fulcrum portion to remove said another end thereof from its position underlying the head, thereby accommodating removal of the mounting from the head.

References Cited in the file of this patent

UNITED STATES PATENTS

| | | |
|---|---|---|
| 810,230 | Swan | Jan. 16, 1906 |
| 1,016,653 | Steinbrenner | Feb. 6, 1912 |
| 1,621,630 | Debus | Mar. 22, 1927 |
| 1,692,178 | Lippert | Nov. 20, 1928 |
| 1,696,355 | Hobbs et al. | Dec. 25, 1928 |
| 2,365,251 | Curtiss | Dec. 19, 1944 |
| 2,417,991 | Nesson | Mar. 25, 1947 |
| 2,511,129 | Schaal | June 13, 1950 |
| 2,704,219 | Harsch | Mar. 15, 1955 |
| 2,715,238 | Krohm | Aug. 16, 1955 |